US010191903B2

(12) United States Patent
Lewis et al.

(10) Patent No.: US 10,191,903 B2
(45) Date of Patent: Jan. 29, 2019

(54) CUSTOMIZED AND CONTEXTUAL TRANSLATED CONTENT FOR TRAVELERS

(71) Applicant: Microsoft Technology Licensing, LLC, Redmond, WA (US)

(72) Inventors: William Duncan Lewis, Seattle, WA (US); Vishal Chandulal Chowdhary, Kirkland, WA (US); Tanvi Saumil Surti, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/282,089

(22) Filed: Sep. 30, 2016

(65) Prior Publication Data

US 2018/0095949 A1 Apr. 5, 2018

(51) Int. Cl.
*G06F 17/27* (2006.01)
*G06F 17/28* (2006.01)
(Continued)

(52) U.S. Cl.
CPC ........ *G06F 17/289* (2013.01); *G06F 17/2735* (2013.01); *G06F 17/2827* (2013.01);
(Continued)

(58) Field of Classification Search
CPC .................................................... G06F 17/289
See application file for complete search history.

(56) References Cited

U.S. PATENT DOCUMENTS 6,192,332 B1* 2/2001 Golding ................ G06F 15/025
704/10
7,643,985 B2 1/2010 Horvitz
(Continued)

FOREIGN PATENT DOCUMENTS

WO 2007032021 A2 3/2007
WO 2012094513 A1 7/2012

OTHER PUBLICATIONS

Al-Mekhlafi, Khalil, Xiangpei Hu, and Ziguang Zheng. "An approach to context-aware mobile Chinese language learning for foreign students." Mobile Business, 2009. ICMB 2009. Eighth International Conference on. IEEE, 2009. (Year: 2009).*
(Continued)

*Primary Examiner* — Brian L Albertalli
(74) *Attorney, Agent, or Firm* — Drinker Biddle & Reath LLP

(57) ABSTRACT

A user context generator determines one or both of a location of a user and contextual information for the user. The contextual information is indicative of content of interest to the user. A custom content generator engine generates customized translated content for the user. Generating the customized translated content includes selecting, from translated content stored in a database, based on the one or both of the determined location of the user and the determined contextual information for the user, translated content to be presented to the user. The customized translated content includes a set of phrases in a source language and corresponding translations of phrases, in the set of phrases, from the source language to a target language. The selected translated content is displayed to the user, such that the user is provided with translated content of interest to the user.

20 Claims, 7 Drawing Sheets

(51) Int. Cl.
*G06F 17/30* (2006.01)
*G10L 13/08* (2013.01)

(52) U.S. Cl.
CPC .... *G06F 17/3087* (2013.01); *G06F 17/30312* (2013.01); *G06F 17/30401* (2013.01); *G06F 17/30528* (2013.01); *G06F 17/30554* (2013.01); *G10L 13/08* (2013.01)

(56) References Cited

U.S. PATENT DOCUMENTS

| | | | |
|---|---|---|---|
| 8,521,122 | B2 | 8/2013 | Scott et al. |
| 8,725,490 | B2 | 5/2014 | Athsani et al. |
| 8,731,513 | B2 * | 5/2014 | Lemberg ............... H04W 4/90 455/404.1 |
| 8,805,672 | B2 * | 8/2014 | Caskey ............... G06F 17/289 704/2 |
| 8,843,359 | B2 | 9/2014 | Lauder |
| 9,208,144 | B1 | 12/2015 | Abdulnasyrov et al. |
| 9,323,854 | B2 | 4/2016 | Massuh |
| 9,332,401 | B2 * | 5/2016 | Jones ..................... H04W 4/06 |
| 9,653,000 | B2 * | 5/2017 | Wee ....................... G09B 19/06 |
| 2003/0033312 | A1 * | 2/2003 | Koizumi ............ G06F 17/2836 |
| 2004/0044674 | A1 | 3/2004 | Mohammadioun et al. |
| 2005/0203727 | A1 * | 9/2005 | Heiner ................ G06F 17/289 704/2 |
| 2009/0094018 | A1 | 4/2009 | Hu et al. |
| 2010/0190479 | A1 * | 7/2010 | Scott .................... G06F 17/289 455/414.1 |
| 2010/0223048 | A1 | 9/2010 | Lauder et al. |
| 2011/0301835 | A1 * | 12/2011 | Bongiorno .......... G01C 21/343 705/6 |
| 2012/0102409 | A1 * | 4/2012 | Fan ........................ H04W 4/00 715/738 |
| 2012/0289156 | A1 * | 11/2012 | Boudville ............. G06F 17/289 455/41.2 |
| 2013/0344896 | A1 * | 12/2013 | Kirmse ............... G06F 17/3087 455/456.3 |
| 2014/0066000 | A1 * | 3/2014 | Butler ............... H04M 1/72538 455/404.2 |
| 2014/0337007 | A1 | 11/2014 | Waibel et al. |
| 2015/0120800 | A1 | 4/2015 | Yarvis et al. |
| 2017/0064512 | A1 * | 3/2017 | Silverberg ............ H04W 4/025 |
| 2018/0004734 | A1 * | 1/2018 | Rottmann ........... G06F 17/2854 |

OTHER PUBLICATIONS

Edge, Darren, et al. "MicroMandarin: mobile language learning in context." Proceedings of the SIGCHI Conference on Human Factors in Computing Systems. ACM, 2011. (Year: 2011).*

Serban, Alex, "10 Best Translating Apps for Mobile Devices [Online & Offline]", Published on: Jun. 5, 2013, Available at: http://techpp.com/2013/06/05/best-translating-apps/.

"A New Way to Travel with American Express", Published on: Nov. 13, 2014, Available at: http://ezoehunt.com/work/nextpedition/.

Steves, Rick, "Smartphone Apps for Travelers", Published on: Mar. 2, 2014, Available at: https://www.ricksteves.com/travel-tips/phones-tech/apps-for-travelers.

Liu, et al., "A Crowdsourcing Based Mobile Image Translation and Knowledge Sharing Service", In the Proceedings of the 9th International Conference on Mobile and Ubiquitous Multimedia, Article No. 6, Dec. 1, 2010, 9 Pages.

"International Search Report and Written Opinion Issued in PCT Application No. PCT/US2017/053145", dated Dec. 20, 2017, 13 Pages.

* cited by examiner

CUSTOMIZED AND CONTEXTUAL TRANSLATED CONTENT FOR TRAVELERS

FIELD OF THE DISCLOSURE

The present disclosure relates generally to content translation and, more particularly, to a customized and contextual content translation system.

BACKGROUND

Machine translation systems are generally used to facilitate translation of text from a source language to a target language. Translations are typically initiated by a user, where the user provides a translation query, for example by entering the translation query via text or via speech, into a user device such as a computer or a mobile phone. The query is then translated into a language indicated by the user, and the translation is displayed to the user via the user device. However, in some situations, such user-provided query based translation systems are slow, inconvenient, and prone to error. For example, in a travel situation, if a user wants to effectively communicate with local people in a foreign language, typing or speaking a query into a user device may take too long and the user is likely to make a mistake. Moreover, it may take long for the translation system to produce a translation, and the translation may be inaccurate, for example due to user entry error or inaccuracies that may be associated with machine translations.

SUMMARY

In an embodiment, a customized translated content system comprises a database configured to store translated content. The customized translated content system also comprises a user context generator configured to determine one or both of (i) a location of a user and (ii) contextual information for the user, the contextual information indicative of content of interest to the user. The customized translated content system additionally comprises a custom content generator engine configured to generate customized translated content for the user, wherein generating the customized translated content includes selecting, based on one or both of the determined location of the user and the determined contextual information for the user, the customized translated content from translated content stored in the database, wherein the customized translated content includes (i) a set of phrases in a source language and (ii) corresponding translations of phrases, in the set of phrases, from the source language to a target language. The custom content generator engine is further configured to cause the selected customized translated content to be displayed to the user, such that the user is provided with translated content of interest to the user.

In another embodiment, a tangible, non-transitory computer readable medium, or media, storing machine readable instructions that, when executed by one or more processors, cause the one or more processors to: determine one or both of (i) a location of a user and (ii) contextual information for the user, the contextual information indicative of content of interest to the user; generate, based on the one or both of the determined location of the user and the determined contextual information for the user, customized translated content to be presented to the user, wherein the customized translated content includes (i) a set of phrases in a source language and (ii) corresponding translations of phrases, in the set of phrases, from the source language to a target language; and cause the customized translated content to be displayed to the user, such that the user is provided with translated content of interest to the user.

In yet another embodiment, a computer implemented method for generating customized translated content includes determining, by a processor, one or both of (i) a location of a user and (ii) contextual information for the user, the contextual information indicative of content of interest to the user. The method also includes generating, by the processor based on one or both of the determined location of the user and the determined contextual information for the user, customized translated content to be presented to the user, wherein the customized translated content includes (i) a set of phrases in a source language and (ii) corresponding translations of phrases, in the set of phrases, from the source language to a target language. The method additionally includes causing, by the processor, the customized translated content to be displayed to the user, such that the user is provided with translated content of interest to the user.

DETAILED DESCRIPTION

In various embodiments described below, customized translated content is generated based on location and/or contextual information for a user of a user device, and the customized translated content is displayed to the user via the user device. The generated translated content may include, for example, a set of words, sentences and/or phrases that may be of interest to the user based on the contextual information for the user. As an example, the generated translated content may be a phrasebook that includes the set of words, sentences and/or phrases in a source language (e.g., native language) of the user device, and corresponding translations of the words, sentences and/or phrases into a target language of interest to the user (e.g., a local language of region of travel planned for or taken by the user) of the user device. The phrasebook may be generated based on a detected geographical location (also referred to herein as "geolocation") and/or contextual location in which the user device is currently located, or may be generated based on travel itinerary of a user, for example. The travel itinerary may be provided by the user (e.g., via an input of the user device), or may be obtained automatically by the user device for example by analyzing user emails related to travel, such as emails that the user may have received when planning a trip.

The words, sentences and/or phrases to be included in the custom phrasebook may be selected, based on the user location and/or contextual information, from a database or databases that store more general words, sentences and/or phrases that may generally be useful during travel. Such general content may be human generated and/or may be crowdsourced via collection of translation queries in various geographical and contextual locations. Selected words, sentences and/or phrases may be further customized based on user information, such as by inserting specific details (e.g., flight number, hotel name, etc.) into predetermined phrases (e.g. how do I get to . . . ?). The generated custom phrasebook may be displayed to the user, and the user may be given various options for actions that may be taken with respect to displayed items, such as to select a phrase, to display a phrase full screen, to play a phrase as audio, etc. Generation of customized translated content based on user location and/or contextual information may eliminate inaccuracies and overhead associated with user-provided query based translations, and may improve speed of translation by providing to a user content of interest tailored specifically to the user, in at least some embodiments.

Figure 1:
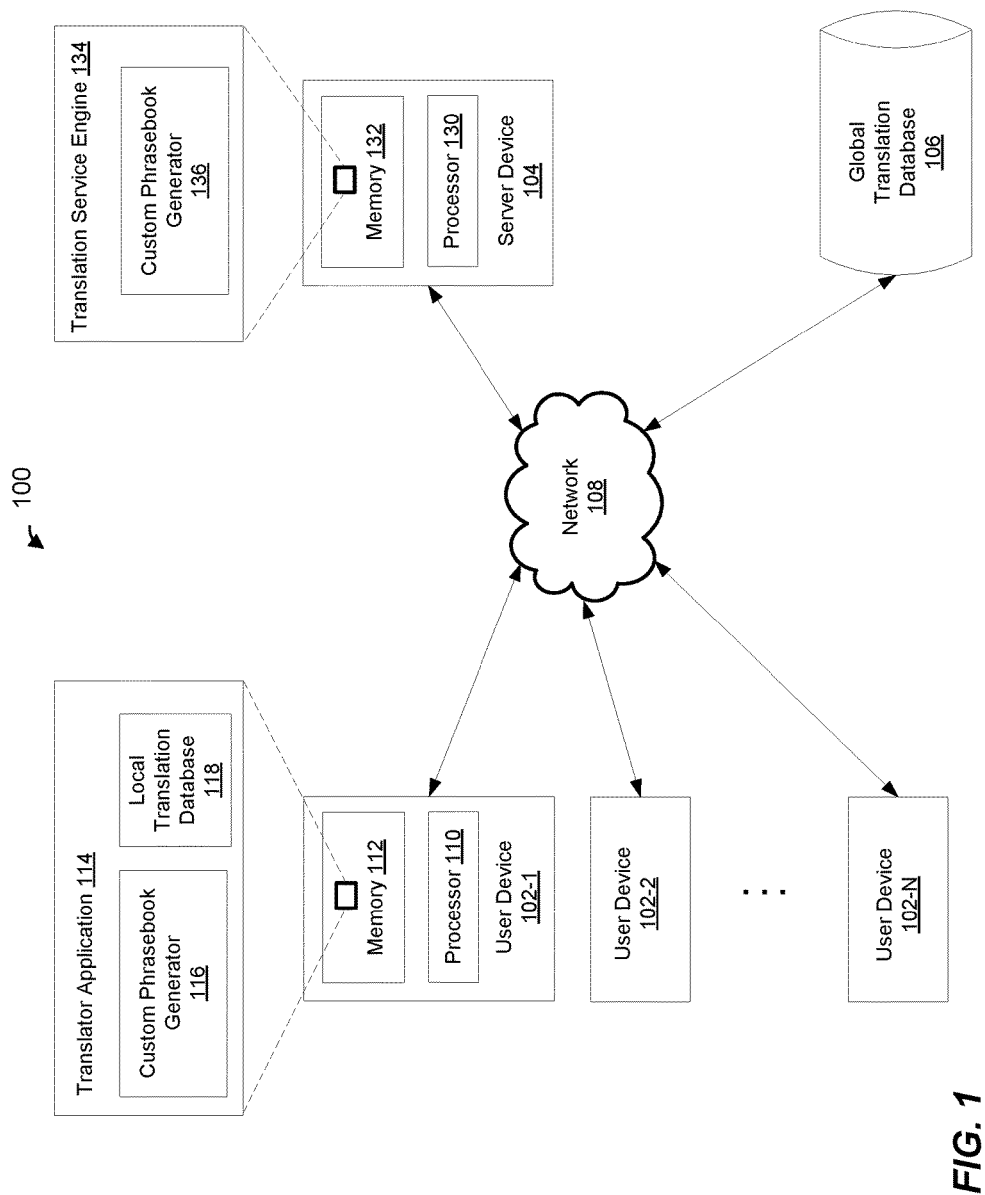
FIG. 1 is a block diagram of a computing system in which customized and contextual translated content techniques may be implemented to generate and display customized translated content for travelers, according to an embodiment.

FIG. 1 is a block diagram of a computing system 100 in which customized and contextual translated content techniques may be implemented to generate and display customized translated content for travelers, according to an embodiment. In an embodiment, the computing system 100 one or more user devices 102 communicatively coupled to a server device 104 via a network 106. The network 108 may be a wide area network (WAN) such as the Internet, a local area network (LAN), or any other suit able type of network. The network 106 may be single network or may be made up of multiple different networks, in some embodiments. The system 100 also includes a global translation database 106. The global translation database 108 may be communicatively coupled to the server device 104 and/or to the one or more user devices 102 via the network 108, as illustrated in FIG. 1, or may be coupled to the server device 104 and/or to the one or more user devices 102 in other suitable manners. For example, the database 106 may be communicatively coupled to the database 108 may be directly connected to the server device 102, or may be included as part of the server device 102, in some embodiments. The database 108 may be a single database or may include multiple different databases. The user devices 102 may include, for example, personal computers, cellular phones, smart phones, web-enabled televisions, and other suitable web-enabled devices communicatively coupled to the server 104 via the network 108.

The user device 102-1 is illustrated in FIG. 1 as including a processor 110 and a computer readable memory 112 that stores computer readable instructions executable by the processor 110. The computer readable memory 114 may store a translation application 114. The computer readable memory 112 may include volatile memory to store computer instructions, such as Random Access Memory (RAM), and may also include persistent memory such as a hard disk, for example. In some embodiments, the user device 102-1 includes multiple processors 110. Further, in some embodiments, the translation application 114 may be implemented using hardware components, firmware components, software components, or any combination thereof.

The translation application 114 may allow a user of the user device 102-1 to perform translations of words, phrases, sentences, etc. from a source language (e.g., a user's native language) to a target language (e.g., a language of a country or region in which the user is located), in various embodiments. In an embodiment, the translation, application 114 includes a custom phrasebook generator 116. In general, the custom phrasebook generator 116 is configured to generate custom phrasebooks based on information about a user, such as a geographical and/or a contextual location of the user. The custom phrasebook generator 116 may be configured to generate a user context for a user, where the user context may indicate one or more languages (e.g., French, Italian, etc.) of interest to the user, the geographical location (e.g., Paris, Rome, etc.) of the user, a contextual location of the user, such as a locale or venue in which the user is located (e.g., airport, hotel, restaurant, etc.), specific information related to a trip (e.g., flight number, hotel name, restaurant address, etc.), etc. The custom phrasebook generator 116 may then generate a custom phrasebook for the user based on the user context generated for the user. The custom phrasebook may include a set of phrases that may be of interest to the user, such as phrases that are relevant to the contextual location of the user, and translations of the phrases into the language corresponding to geolocation of the user. For example, the custom phrasebook generator may generate the custom phrasebook to include a first set of phrases if the user is located in an airport, a second set of phrases different from the first set of phrases if the user is located in a hotel, a third set of phrases different from the first set of phrases and the second set of phrases if the user is located in a restaurant, and so on, in various embodiments.

The custom phrasebook generator 116 may be configured generate the custom phrasebook by selecting, based on user context information, phrases from one or more translation databases, such as the global translation database 106 and/or a local translation database 118. The local database 118 may be provided to the user device 102-1 as part of the translator application 114 an may be stored in a memory of the user device 102-1 such as the memory 112, as shown in FIG. 1, or a suitable memory other than the memory 112. For example, the local translation database 118 may be provided to the user device 102-1 when the user device 102-1 acquires (e.g., downloads) the translator application 114. The local translation database 118 may be subsequently updated and/or upgraded either automatically or when an update is requested by a user of the user device 102-1, in some embodiments. The local translation database 118 may store a set of phrases generally related to travel, for example. Additionally, the local translation database 118 may store translations of the phrases from a source language to a plurality of target languages, in an embodiment. The custom phrasebook generator 116 may be configured to select, based on user context information, a subset of the set of phrases in the local translation database 118 to be "surfaced" to the user, such that the user is provided with only those phrases that may potentially be of interest to the user based on the user context.

Additionally or alternatively, the custom phrasebook generator 116 may include, in the custom phrasebook, phrases selected from the global translation database 106. The global translation database 106 may store translation queries entered by multiple users of multiple user devices 102 and collected over time by the server device 104, for example. The translation queries in the global translation database 106 may be tagged with geographical locations and/or contextual locations in which the queries were entered by users of the user devices 102. In this manner, phrases available for selection for generation of custom phrasebooks may be crowdsourced from multiple users of the multiple user devices 102 over time. In an embodiment, the custom phrasebook generator 116 is configured to access the global translation database 106 and select, based on context information corresponding to a user, queries from the global translation database 106 to be included in a custom phrasebook for the user. For example, the custom phrasebook generator 116 may select one or more queries tagged with a geographical location corresponding to the geographical location of the user, such as frequently entered queries in the geographical location of the user. As another example, the custom phrasebook generator 116 may select one or more queries tagged with a contextual location corresponding to the contextual location of the user, such as queries frequently entered in the contextual location of the user and in various geolocations.

The server device 104 may include a processor 130 and a computer readable memory 132 that stores instructions executable by the processor 130. The memory 132 stores a translation service engine 134 configured to provide translations for queries (e.g., words or phrases) received by the server device 104 from the user devices 102. The computer readable memory 132 may include volatile memory to store computer instructions, such as Random Access Memory (RAM), and may also include persistent memory such as a hard disk, for example. In some embodiments, the server device 104 includes multiple processors 110. Further, in some embodiments, the translation service engine 134 may be implemented using hardware components, firmware components, software components, or any combination thereof.

The translation service engine may include a custom phrasebook generator 136. The custom phrasebook generator 136 may be the same or similar to the custom phrasebook generator 116. In general, the custom phrasebook generator 136 is configured to generate custom phrasebooks for users of the user devices 102 based on location and/or contextual information corresponding to the user devices 102. The server device 104 may receive the location and/or contextual information from a user device 102 via the network 108, and may generate a custom phrasebook for the user for example by selecting, based on the contextual information received from the user, appropriate words, phrases and/or crowd-sourced translation queries from the global translation database 106. The translation service engine 134 may then provide the custom phrasebook generated for the user to the user device 102. For example, the custom phrasebook generated for the user may be provided to the user device 102 via the network 108.

In some embodiments, one of the (i) custom phrasebook generator 116 and (ii) custom phrasebook generator 136 is omitted from the system 100. For example, in an embodiment in which the custom phrasebook generator 116 is omitted from the user device 102-1, the user device 102-1 relies on the custom phrasebook generator 130 of the server device 104 for generation of custom phrasebooks for the user device 102-1. As another example, in an embodiment in which the custom phrasebook generator 136 is omitted from the server device 104, a user device 102 relies on the custom phrasebook generator 116 to generate custom phrasebooks for the user device 102 locally at the user device 102. In an embodiment in which neither one of the (i) custom phrasebook generator 116 and (ii) custom phrasebook generator 136 is omitted from the system 100, custom phrasebook generation for a user device 102 may be performed by the custom phrasebook generator 136 (e.g., when the user device 102 is operating "on-line"), may be performed locally by the custom phrasebook generator 116 (e.g., when the user device 102 is operating "off-line"), or may be partially performed by the custom phrasebook generator 116 (e.g., using the local database 118) and partially performed by the custom phrasebook generator 136 (e.g., using the global database 106).

Figure 2:
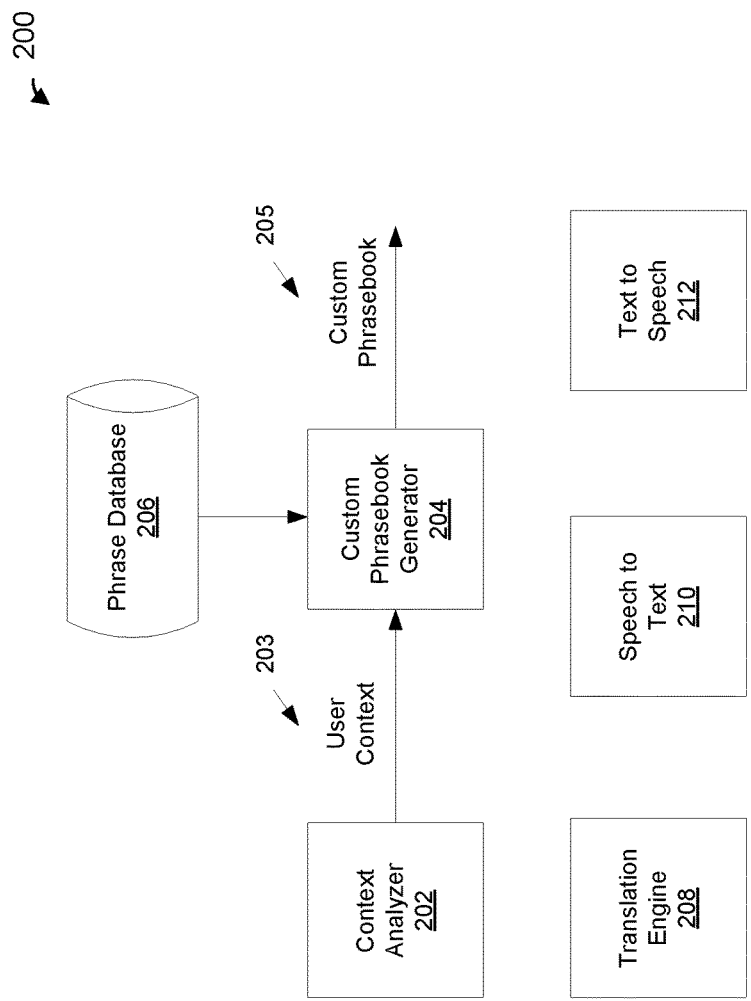
FIG. 2 is a block diagram of an example customized content generation system that may be used with the computing system of FIG. 1, according to an embodiment.

FIG. 2 is a block diagram of a customized translated content system 200, according to an embodiment. The customized translated content system 200 may be included in a user device such as the user device 102-1, in an embodiment. In another embodiment, portions of the customized translated content system may be included in a server device, such as the server device 104. For ease of explanation, the system 200 is described below with reference to the user device 102-1. However, the system 200 is implemented in a suitable device different from the user device 102-1 in some embodiments.

The customized translated content system 200 includes a context analyzer 202 coupled to a custom phrasebook generator 204. The context analyzer 202 may be configured to generate a user context 203 for a user of the user device 102-1. The user context 203 may indicate geolocation and/or contextual location of the user. The context analyzer 202 may determine the geolocation and/or the contextual location by analyzing input from a sensor, such as a global positioning system (GPS) sensor included in the user device 102-1. Additionally or alternatively, user context 203 to include information obtained by the context analyzer 202 based on analyzing user emails related to travel, such as emails that the user may have received while planning a trip. For example, the context analyzer 202 may access the user's email mailbox (e.g., email inbox) to search for emails related to an itinerary of a trip. The context analyzer 202 may, for example, search for emails related to transportation (e.g., flight confirmation email, train ticket confirmation email, car reservation email, etc.), emails related to accommodations reserved for the user (e.g., hotel reservation email), emails related to restaurant reservations, emails related to tour or cruise ticket reservations, etc. The context analyzer 202 may analyze such emails to determine various details of the trip, and may include such details in the user context 203. As an example, the user context 203 generated for a user may indicate one or more target languages (e.g., French, Italian, German, etc.) of one or more countries that the user is planning to visit during a trip and/or may indicate one or more contextual locations (e.g., airport, train station, hotel, etc.) in which the user is expected to be during the trip, in various embodiments.

The context analyzer 202 may provide the generated user context 203 to the custom phrasebook generator 204. The custom phrasebook generator 204 may generate a custom phrasebook 205 for the user based on the context 203 provided by the context analyzer 202. The custom phrasebook 205 may include a set of phrases that may be of interest to the user. The set of phrases may be selected from a database of phrases 206, for example. Additionally, at least some of the phrases may be further customized for the user, for example by inserting into the phrases information specific to the trip of the user, such as a specific hotel name, a specific flight number, etc. determined based on emails The custom phrasebook further includes translations of the phrases from the user's source language to the one or more target languages indicated in the user context 203, in an embodiment. The custom phrasebook 205 may be displayed to the user via a screen (e.g., a phone screen or a monitor) of the user device 102-1. The user may be given an option to select, for the custom phrasebook custom phrasebook 205 displayed to the user, phrases that are of interest to the user. The user may be given options to add the selected phrase to favorites, to audio-play a selected phrase, to display a larger view of the selected phrase (e.g., to show the selected phrase to another person), etc., in various embodiments.

The customized translated content system 200 further includes a translation engine 208, a speech to text engine 210, and a text to speech engine 212, in an embodiment. The translation engine 208 may provide translations for translation queries manually entered by a user. The translation engine 208 may allow the user, for example, to obtain translations for additional words or phrases that may be of interest to the user but that may not be included in the custom phrasebook 205. The speech to text engine 210 is configured to generate an audio output for each phrase in the custom phrasebook 205. Similarly, the text to speech engine 212 is configured to generate text based on an audio input to allow a user to retrieve a phrase in the custom phrasebook 205 by speaking the phrase into a microphone of the user device. In an embodiment, the speech to text engine 210 and the text to speech engine 212 may each comprise a neural network that is trained based on travel content. Such neural networks may be relatively smaller as compared to more general neural networks used in speech generation and speech recognition systems. The speech to text engine 210 and the text to speech engine 212 may, therefore, be locally provided (e.g., stored) in the user device 102-1, and may be available for use when the user device 102-1 is operating off-line, for example.

Figure 3:
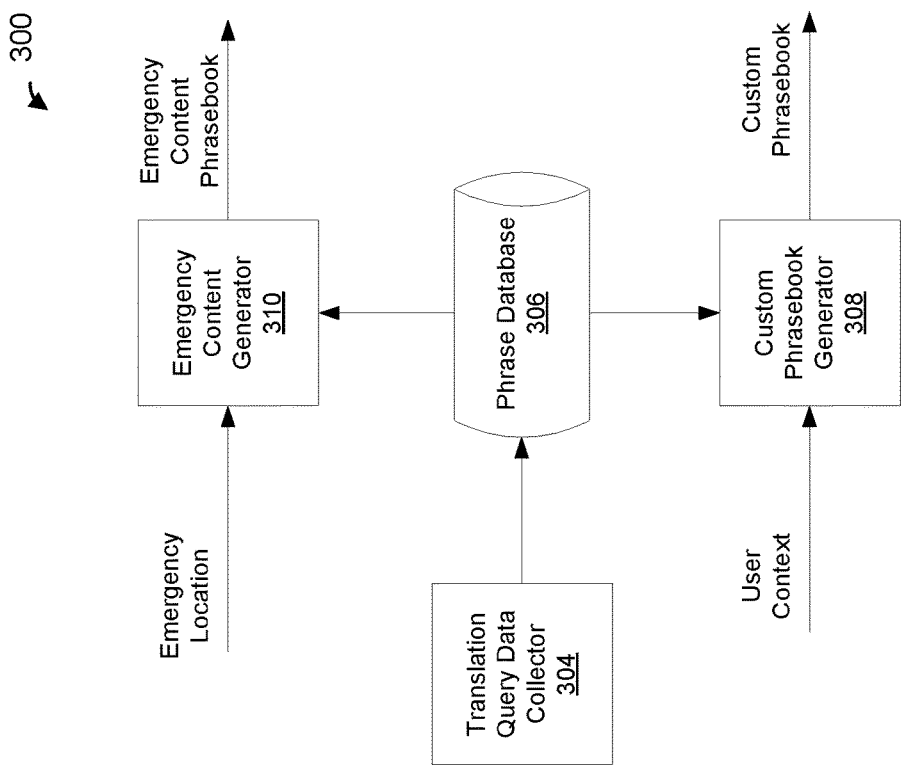
FIG. 3 is a block diagram of another example customized content generation system that may be used with the computing system of FIG. 1, according to an embodiment.

FIG. 3 is a block diagram of a system 300 for generating customized translated content based collected translation queries, according to an embodiment. Components of the system 300 may be included in a server device, such as the server device 104, in an embodiment. For ease of explanation, the system 300 is described below with reference to the server device 104. However, the system 300 is implemented in a suitable device different from the server device 104 in some embodiments.

The system 300 includes a translation query collection engine 304 coupled to a database 306. The database 306 may be stored in a memory included in the system 300 (e.g., included in the server device 104), or may be stored in a memory external to and accessible by the system 300 (e.g., the server device 104). For example, the database 306 may be stored in a data storage device coupled to the server device 104, such as the data store 106. The translation query collection engine 304 may receive queries entered into user devices 102, and may store the queries in the database 306. Additionally, the translation query collection engine 304 may associate the queries in the database 306 with indications of geolocations and/or contextual locations at which the queries were entered.

The system 300 may further include a custom phrasebook generator 308 coupled to the database 306. The translated content generator may generate custom phrasebooks using the translation queries stored in the database 306. For example, the translated content generator 306 may generate custom phrasebooks to include frequently entered words and/or phrases at particular geolocations and/or particular contextual locations. Such custom phrasebooks may then be provided to a user device based on the geographical and/or contextual location of the user device. The user device may then display the phrasebook to a user. The user may be given an option to select, for the custom phrasebook presented to the user, phrases that are of interest to the user. The user may be given options to add the selected phrase to favorites, to audio-play a selected phrase, to display a larger view of the selected phrase (e.g., to show the selected phrase to another person), etc., in various embodiments. In some embodiments, the user may additionally be given an option to provide feedback for the phrases in the custom phrasebook generated by the customized translated content generator 304. For example, the user may be given an option to provide feedback for a phrase to indicate usefulness of the phrase to the user. In an embodiment, the user may indicate usefulness of phrases by up-voting phrases that the user finds useful and down-voting phrases that the user does not find useful. The feedback from the user may be provided to the custom translated content generator 306 and may subsequently be used by the custom translated content generator 306 to adapt subsequent phrasebook generation, for example by up-ranking phrases that are indicated by the feedback to be more useful, down-ranking or removing from selection phrases that are indicated by the feedback to be more useful.

In some embodiments, the system 300 may include an emergency content generator 310 configured to crowdsource human translations, for a predetermined set of emergency phrases, from a source language into a local language of an emergency location. Emergency content may include phrases related to various emergency situations. Example emergency situations may include, but are not limited to, natural disasters, such as earthquakes, tsunamis, floods, etc., and other situations that may require humanitarian relief, such as refugee crises, war calamities, etc., for example. The predetermined set of phrases may be stored in the phrase database 306, for example. The predetermined set of phrases may include phrases that may be useful in an emergency situation. For example, the predetermined set of phrases may include phrases that may be needed by aid responders to communicate with local people at the geographical location in which a calamity has occurred. When the emergency situation arises, the emergency content generator 310 may quickly and efficiently crowdsource human translations of the phrases in the predetermined set of phrases stored in the database 306 into the target language of the geographical location in which the emergency occurred. The crowdsourced translations may then be made available to users (e.g., aid workers) by generating custom phrasebooks for the users to include the predetermined set of phrases along with the crowdsourced translations.

Figure 4:
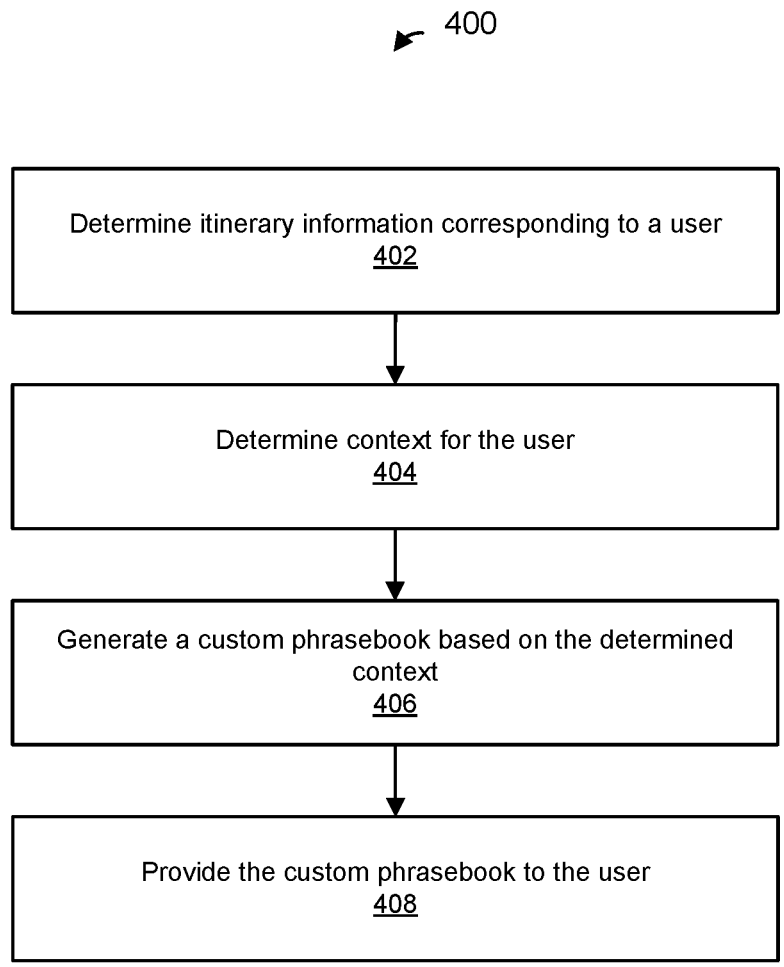
FIG. 4 is a flow diagram of an example process, that may be implemented in the computing system of FIG. 1, for generating customized translated content based on travel itinerary information, according to an embodiment.

FIG. 4 is a flowchart of a process 400 for generating a custom phrasebook for a user based on travel itinerary information obtained for the user, according to an embodiment. In some embodiments, the method 400 is implemented by a user device, such as a user device 102. In another embodiment, at least a portion of the method 400 is implemented by a server device, such as the server device 104. For ease of explanation, the process 400 is described with reference to the user device 102-1 of FIG. 1.

At block 402, itinerary information corresponding to a user is determined. In an embodiment, the itinerary information may be determined based on emails received by the user. For example, the user device 102-1 (e.g., the content analyzer 202) may accesses user's emails to find emails related to travel itinerary for a trip planned for the user, and may determine the itinerary information by processing the emails to parse out the information. In another embodiment, the itinerary information may be determined in suitable manners other than based on user emails. For example, the user may be given an option to enter itinerary information into the user device 102-1.

At block 404, a context for the user is generated based on the itinerary information determined at block 402. The context for the user may indicate one or more languages that may be of interest to the user during the trip. As an example, the user device 102-1 may determine based on itinerary information that the user is visiting one or more specific countries during the trip, such as France and/or Italy, for example. Accordingly, the context for the user generated at block 402 may indicate French and/or Italian as languages of interest to the user. Additionally, the context generated at block 404 may include specific travel information obtained from itinerary information for the trip. For example, the context may indicate one or more of a flight number, a train station name, a car rental agency name, a hotel name, a hotel address, a restaurant name, a restaurant address, etc.

At block 406, a custom phrasebook may be generated for the user based on the context determined for the user at block 404. The custom phrasebook may be generated using a phrasebook database, such as the database 118 and/or the database 106. The custom phrasebook may be generated to include words and/or phrases that may be of interest to the user during the trip. For example, if the context indicates that the user is flying into Paris, the custom phrasebook may include words and/or phrases that the user may find useful in an airport and corresponding translations of the words and/or phrases into French. Similarly, if the context indicates that the user is taking a train to Rome, the custom phrasebook may be generated to include words and/or phrases that the user may find useful in a train station and corresponding translations of the words and/or phrases into Italian. The words and/or phrases may be selected from a larger set or pool of travel words and/or phrases stored in the database 118 and/or the database 106.

In some embodiments, generating the custom phrasebook at block 406 may include inserting custom information into phrases selected from the phrase database 206. For example, if the context generated for the user indicates that the user is staying at the Paris Sheraton during the trip, then a phrase "Where can I get a taxi to the . . . " may be customized by inserting "Paris Sheraton" to generate "Where can I get a taxi to the Paris Sheraton?" As just another example, if the context generated for the user indicates a flight number A123, then a phrase "Which is the gate for flight number . . . " may be customized by inserting A123 to generate the phrase "Which is the gate for flight number A123?"

At block 408, the custom phrasebook generated at block 406 is presented to the user. For example, the custom phrasebook is displayed on a screen of the user device 102-1. Presenting the custom phrasebook to the user may include providing one or more options for further customization of the phrasebook by the user. For example, options may be provided to delete phrases from the custom phrasebook, to insert additional phrases into the custom phrasebook, to mark phrases as favorites, etc. Additionally, options may be provided to display a phrase full-screen, to play the phrase as audio via a speaker included in the user device 102-1, to retrieve a phrase by speaking the phrase into a microphone of the user device 102, etc.

Figure 5:
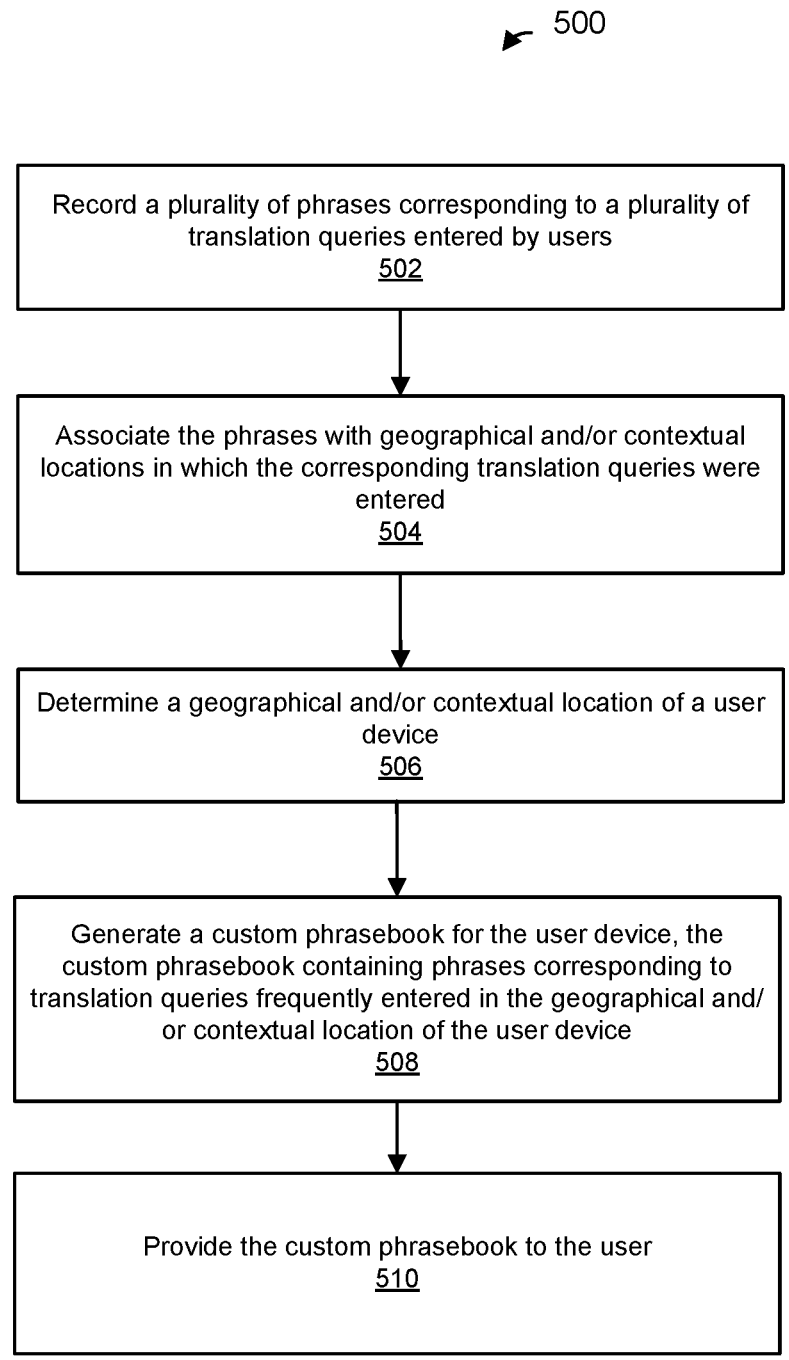
FIG. 5 is a flowchart of an example process, that may be implemented in the computing system of FIG. 1, for generating a customized phrasebook for a user based on recorded translation queries entered by other users in a geographical and/or contextual location of a user device, according to an embodiment.

FIG. 5 is a flowchart of a process 500 for generating a custom phrasebook for a user based on recorded translation queries entered by other users in a geographical and/or contextual location of a user device, according to an embodiment. In some embodiments, the method 500 is implemented by a user device, such as a user device 102. In another embodiment, at least a portion of the method 500 is implemented by a server device, such as the server device 104. For ease of explanation, the process 500 is described with reference to the server device 104 of FIG. 1.

At block 500, a plurality of translation queries entered by multiple users may be recorded in a database. For example, the server device 104 (e.g., the translation service engine 134 of the server device 104) records translation queries that the server device 104 receives from multiple user devices 102. The translation queries may be recorded in the global translation database 106, for example. For example, when the server device 104 receives a query from a user device 102, the server device 104, in addition to providing a translation for the query to the user device 102, records the query in the database 106, in an embodiment. In some embodiments, the translation for the query is also recorded in the database 106 so that the translation may subsequently be included in custom phrasebooks generated for users of other user devices 102. In an embodiment, translation queries entered into the user devices 102 are provided directly from the user devices 102 to the translation database 106.

At block 504, the recorded translation queries are associated (e.g., tagged) with geographical and/or contextual locations in which the translation queries were entered. For example, the user devices 102 (e.g., the translation application 114 of the user devices 102) are configured to, when transmitting to the server device 104 a query entered into the user device 102, also provide to the server device 104 an indication of the geographical location and/or contextual location in which the user device 102 is currently located. The server device 104 may record the indication of the geographical and/or contextual location provided by the user device 102 and associated with indication with the translation query in the database 106. In another embodiment, the indication of the geographical and/or contextual location in which a translation query is entered may be provided along with the translation query directly from the user device 102.

At block 506, geographical location and/or contextual location of a user device is determined. For example, the geographical location and/or contextual location of a user device may be determined based on a user context generated for the user device.

At block 508, a custom phrasebook for the user device is generated based on the geographical location and/or contextual location of the user device. For example, the custom phrasebook generator 116 of the user device 102-1 or the custom phrasebook generator 136 of the server device 104 may generate the custom phrasebook at block 508. In an embodiment, the custom phrasebook is generated at least in part based on the translation queries recorded at block 502. For example, the translation queries may be sorted by geographical and/or contextual location associated with the queries to determine relatively more frequently entered queries at particular geographical and/or contextual locations. The translation queries may be ranked for particular geographical and/or contextual translations based on frequency of entry of the queries in the particular geographical and/or contextual translations. The custom phrasebook may be generated based on the geolocation and/or contextual location of the user device, by selecting more frequently entered (e.g., higher ranked) translation queries associated with the corresponding geolocation and/or contextual location in the database 106.

At block 510, the custom phrasebook generated at block 508 is presented to the user. For example, the custom phrasebook is displayed on a screen of the user device 102. Presenting the custom phrasebook to the user may include providing one or more options for further customization of the phrasebook by the user. For example, options may be provided to delete phrases from the custom phrasebook, to insert additional phrases into the custom phrasebook, to mark phrases as favorites, etc. Additionally, options may be provided to display a phrase full-screen, to play the phrase as audio via a speaker included in the user device 102, to retrieve a phrase by speaking the phrase into a microphone of the user device 102, etc. In some embodiments, the user may additionally be given an option to provide feedback for the phrases in the custom phrasebook generated at block 508. For example, the user may be given an option to provide feedback for a phrase to indicate usefulness of the phrase to the user. In an embodiment, the user may indicate usefulness of phrases by up-voting phrases that the user finds useful and down-voting phrases that the user does not find useful. The feedback from the user may be used to adapt subsequent phrasebook generation, for example by up-ranking phrases that are indicated by the feedback to be more useful and/or down-ranking or removing from selection phrases that are indicated by the feedback to be less useful.

Figure 6:
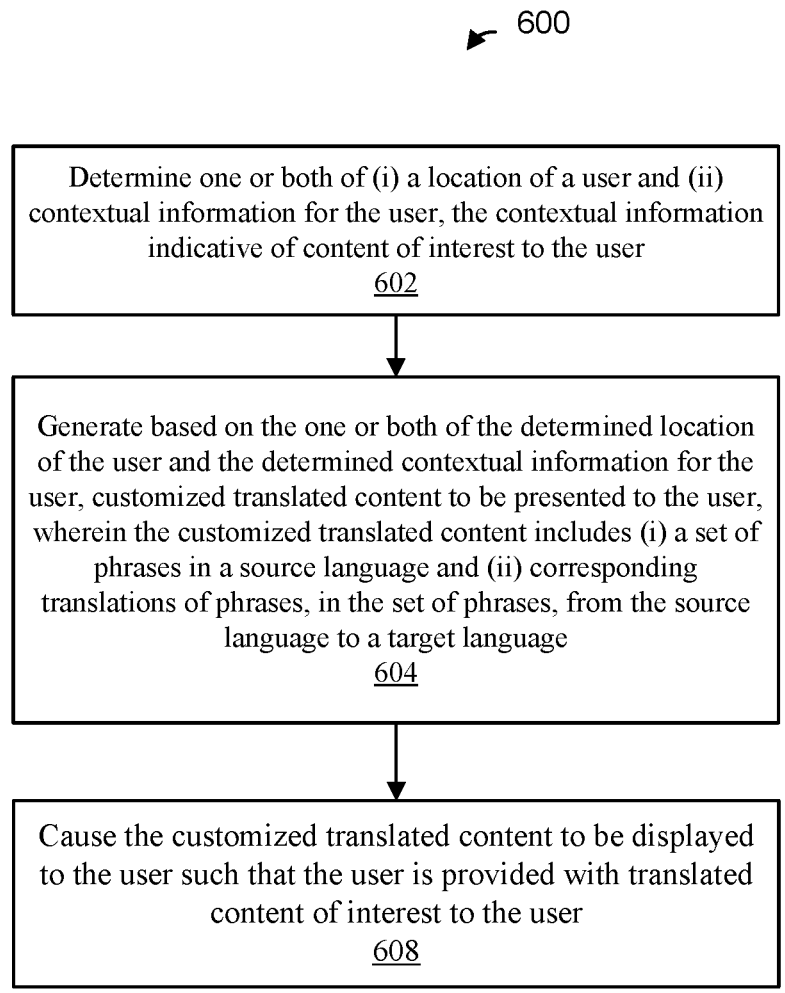
FIG. 6 is a flow diagram illustrating an example method, that may be implemented in the computing system of FIG. 1, for generating customized translated content for a user based on user context, according to an embodiment.

FIG. 6 is a flow diagram of a method 600 for generating customized translated content for a user based on user context, according to an embodiment. In an embodiment, the method 600 is implemented by a user device such as the user device 102-1 of FIG. 1. In an embodiment, the method 600 is implemented at least partially by a server device such as the server device 104 of FIG. 1. In other embodiments, the method 600 is implemented by suitable computing devices different from the user device 102-1 and/or the user device 104 of FIG. 1.

At block 602, one or both of (i) a location of a user and (ii) contextual information for the user may be determined. The location of the user may include a geographical location of the user. The location of the user may be a geographical location of the user, and may be indicative of a target language of interest to the user. The contextual information for the user may include a contextual location of the user, such as a locale or a venue in which the user is located. Additionally, the contextual information for the user may include specific travel details of a trip, for example obtained from travel related emails that may have been received by the user as the user was planning the trip.

At block 604, custom translated content is generated for the user based on the one or both location of the user and contextual information for the user determined at block 602. The customized translated content generated at block 64 may include (i) a set of phrases in a source language and (ii) corresponding translations of phrases, in the set of phrases, from the source language to a target language. The source language may be a native language of the user, and the target language may be a local language of the geographical region in which the user is located, for example. The target language may be automatically determined based on the location of the user determined at block 62. The set of phrases included in the custom translated content may be selected for a larger set of phrases stored in a database, for example.

At block 608, the custom translated content generated for the user at block 604 is displayed to the user. Because the custom translated content is generated to include a set of phrases selected based on one or both of (i) the location of the user and (ii) the contextual information for the user, the content displayed to the user at block 608 will include only those phrases that may be of interest to the user, in an embodiment.

In an embodiment, a customized translated content system comprises a database configured to store translated content. The customized translated content system also comprises a user context generator configured to determine one or both of (i) a location of a user and (ii) contextual information for the user, the contextual information indicative of content of interest to the user. The customized translated content system additionally comprises a custom content generator engine configured to generate customized translated content for the user, wherein generating the customized translated content includes selecting, based on one or both of the determined location of the user and the determined contextual information for the user, the customized translated content from translated content stored in the database, wherein the customized translated content includes (i) a set of phrases in a source language and (ii) corresponding translations of phrases, in the set of phrases, from the source language to a target language. The custom content generator engine is further configured to cause the selected customized translated content to be displayed to the user, such that the user is provided with translated content of interest to the user.

In other embodiments, the customized translated content system comprises any suitable combination of one or more of the following features.

The user context generator is configured to determine the one or both of (i) the location of the user and (ii) the contextual information for the user based on travel itinerary data obtained for the user.

The user context generator is configured to obtain the travel itinerary data by searching emails of the user to find emails related to travel that include the itinerary data.

The custom content generator engine is configured to generate at least some of the customized content for the user by inserting, into at least one predetermined phrase, at least one specific travel detail obtained from the travel itinerary data for the user.

The user context generator is configured to determine a geographical location of the user, and wherein the custom content generator engine is configured to generate the customized translated content based on collected translation queries entered by other users in the geographical location of the user.

The user context generator is configured to determine a contextual location of the user, and wherein the custom content generator engine is configured to generate the customized translated content based at least in part on collected translation queries entered by other users in same contextual locations in geographical locations other than a geographical location of the user.

The customized translated content system further comprises one or both of (i) travel specific speech recognition engine and (ii) travel specific text to speech engine.

The one or both of (i) travel specific speech recognition engine and (ii) travel specific text to speech engine are trained based on the custom content presented to the user.

The customized translated content system further comprises an emergency content generator configured to crowd-source human provided translations for a predetermined set of emergency phrases from a source language into a local language of an emergency location.

In another embodiment, a tangible, non-transitory computer readable medium, or media, storing machine readable instructions that, when executed by one or more processors, cause the one or more processors to determine one or both of (i) a location of a user and (ii) contextual information for the user, the contextual information indicative of content of interest to the user, generate, based on the one or both of the determined location of the user and the determined contextual information for the user, customized translated content to be presented to the user, wherein the customized translated content includes (i) a set of phrases in a source language and (ii) corresponding translations of phrases, in the set of phrases, from the source language to a target language, and cause the customized translated content to be displayed to the user such that the user is provided with translated content of interest to the user.

In other embodiments, the tangible, non-transitory computer readable medium, or media, storing machine readable instructions that, when executed by one or more processors, cause the one or more processors to implement any suitable combination of one or more of the following features.

Determine the one or both of (i) the location of the user and (ii) the translated content of interest to the user based on travel itinerary data obtain for the user.

Obtain the travel itinerary data corresponding to the user by searching emails of the user to find emails that contain the itinerary data corresponding to the user.

Generate at least some of the customized content for the user by inserting, into a predetermined phrase, custom information obtained from the travel itinerary data for the user.

Determine a geographical of the user and generate the customized translated content based on collected translation queries entered by other users in the geolocation of the user.

Determine a contextual location of the user, and generate the customized translated content based at least in part on collected translation queries entered by other users in the contextual location of the user in geographical locations other than a geographical location of the user.

Crowdsource human provided translations for a predetermined set of emergency phrases from the source language into a local language of an emergency location.

In yet another embodiment, a computer implemented method for generating custom translated content includes determining, by a processor, one or both of (i) a location of a user and (ii) contextual information for the user, the contextual information indicative of content of interest to the user. The method also includes generating, by the processor based on the one or both of the determined location of the user and the determined contextual information for the user, customized translated content to be presented to the user, wherein the customized translated content includes (i) a set of phrases in a source language and (ii) corresponding translations of phrases, in the set of phrases, from the source language to a target language. The method additionally includes causing, by the processor, the customized translated content to be displayed to the user such that the user is provided with translated content of interest to the user.

In other embodiments, the method includes any suitable combination of one or more of the following features.

Determining the one or both of (i) the location of the user and (ii) the contextual information for the user comprises determining the one or both of (i) the location of the user and (ii) the contextual information for the user based on travel itinerary data obtained for the user.

The method further comprises obtaining the travel itinerary data corresponding to the user by searching emails of the user to find emails that contain the itinerary data corresponding to the user.

Generating the customized translated content for the user includes generating at least some of the customized content for the user by inserting, into at least one predetermined phrase, at least one specific travel detail obtained from the travel itinerary data for the user.

Determining the location of the user includes determine one or both of (i) geographical location of the user and (ii) contextual location of the user.

Generating the customized translated content includes generating the customized translated content based on collected translation queries entered by other users in the one or both of (i) geographical location of the user and (ii) contextual location of the user.

Figure 7:
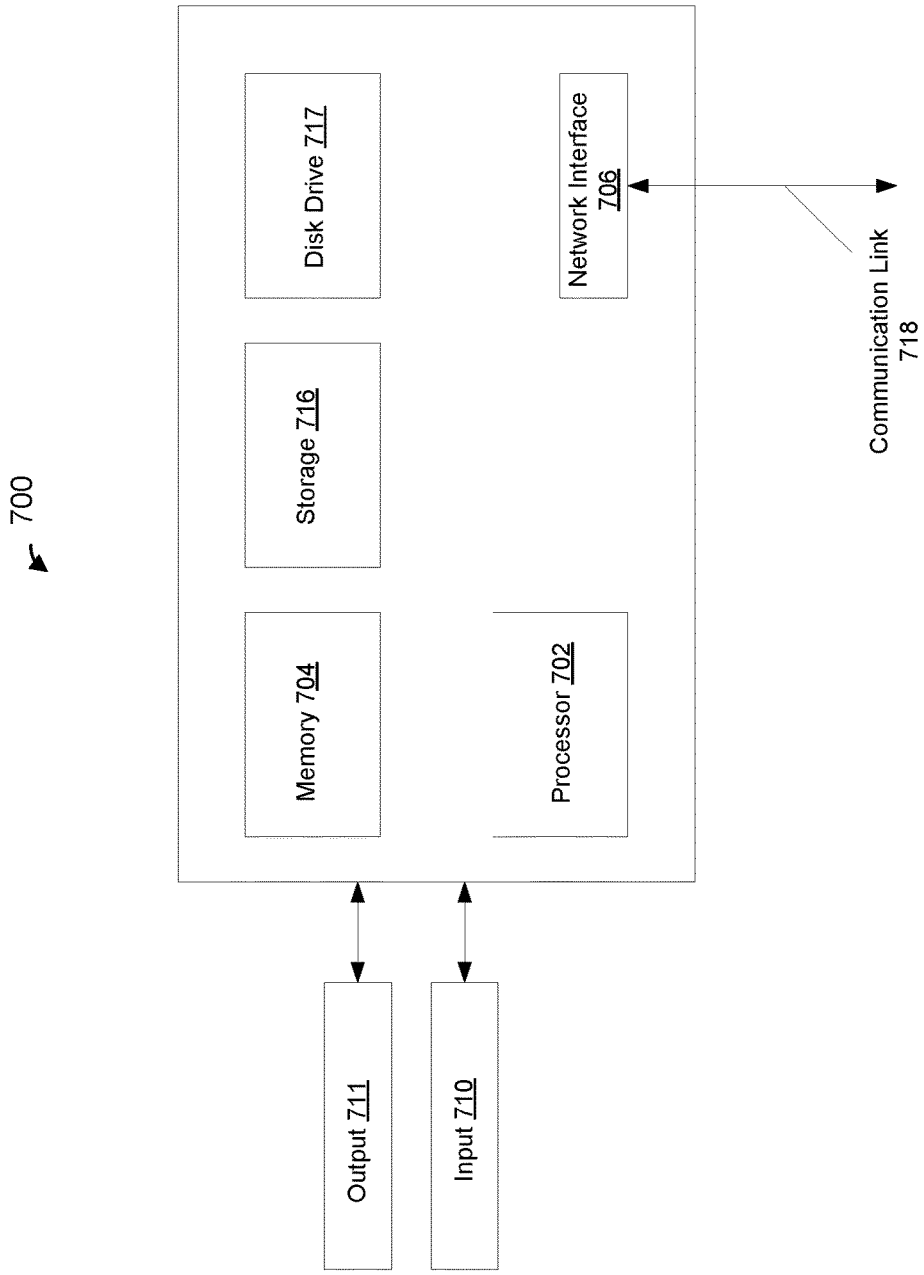
FIG. 7 is a block diagram of a computer system suitable for implementing one or more components of the computing system of FIG. 1, according to an embodiment.

FIG. 7 is a block diagram of a computing system 700 suitable for implementing one or more embodiments of the present disclosure. In its most basic configuration, the computing system 700 may include at least one processor 702 and at least one memory 704. The computing device 700 may also include a bus (not shown) or other communication mechanism for communicating information data, signals, and information between various components of computer system 700. Components may include an input component 710 that processes a user action, such as selecting keys from a keypad/keyboard, selecting one or more buttons or links, etc., and sends a corresponding signal to the at least one processor 702. Components may also include an output component, such as a display, 711 that may display, for example, results of operations performed by the at least one processor 702. A transceiver or network interface 706 may transmit and receive signals between computer system 700 and other devices, such as user devices that may utilize results of processes implemented by the computer system 700. In one embodiment, the transmission is wireless, although other transmission mediums and methods may also be suitable.

The at least one processor 702, which can be a microcontroller, digital signal processor (DSP), or other processing component, processes these various signals, such as for display on computer system 700 or transmission to other devices via a communication link 718. The at least one processor 702 may also control transmission of information, such as cookies or IP addresses, to other devices. The at least one processor 702 may execute computer readable instructions stored in the memory 704. The computer readable instructions, when executed by the at least one processor 702, may cause the at least one processor 702 to implement processes associated with determination of a user context, generation of customized translated content based on the user context, output of the customized translated content, etc. as described above.

Components of computer system 700 may also include at least one static storage component 716 (e.g., ROM) and/or at least one disk drive 717. Computer system 700 may perform specific operations by processor 712 and other components by executing one or more sequences of instructions contained in system memory component 714. Logic may be encoded in a computer readable medium, which may refer to any medium that participates in providing instructions to the at least one processor 702 for execution. Such a medium may take many forms, including but not limited to, non-transitory media, non-volatile media, volatile media, and transmission media. In various implementations, non-volatile media includes optical or magnetic disks, volatile media includes dynamic memory, such as system memory component 716, and transmission media includes coaxial cables, copper wire, and fiber optics. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations of a video processing system have been described herein in terms of "modules" or "components," it is noted that that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A customized translated content system, comprising:
   a local database of a user device, the local database configured to store translated content;
   a user context generator configured to determine one or both of (i) a location of the user device and (ii) contextual information for the user device, the contextual information indicative of content of interest to a user of the user device; and
   a custom content generator engine configured to
   generate customized translated content for the user, wherein the customized translated content includes (i) a plurality of phrases in a source language and (ii) corresponding translations of phrases, in the plurality of phrases, from the source language to a target language, and wherein generating the customized translated content includes selecting, from generalized translated content stored in the local database, respective phrases of the plurality of phrases, wherein the selecting is based on the one or both of the determined location of the user and the determined contextual information for the user; and
   cause the customized translated content to be displayed to the user such that the selected plurality of phrases and corresponding translations are surfaced to the user from the local database of the user device without requiring a phrase query input from the user of the user device.

2. The customized translated content system of claim 1, wherein the user context generator is configured to determine the one or both of the location of the user and the contextual information for the user based on travel itinerary data obtained for the user.

3. The customized translated content system of claim 2, wherein the user context generator is configured to obtain the travel itinerary data by searching emails of the user to find emails related to travel that include the itinerary data.

4. The customized translated content system of claim 2, wherein the custom content generator engine is configured to generate at least some of the customized content for the user by inserting, into at least one predetermined phrase, at least one specific travel detail obtained from the travel itinerary data for the user.

5. The customized translated content system of claim 1, wherein the user context generator is configured to determine a geographical location of the user, and wherein the custom content generator engine is further configured to generate the customized translated content based on collected translation queries stored in a global database communicatively coupled to the user device, the collected translation entries entered by other users in the geographical location of the user.

6. The customized translated content system of claim 1, wherein the user context generator is configured to determine a contextual location of the user, and wherein the custom content generator engine is further configured to generate the customized translated content based at least in part on collected translation queries stored in a global database communicatively coupled to the user device, the collected translation entries entered by other users in same contextual locations in geographical locations other than a geographical location of the user.

7. The customized translated content system of claim 1, further comprising one or both of (i) travel specific speech recognition engine and (ii) travel specific text to speech engine, wherein the one or both of (i) travel specific speech recognition engine and (ii) travel specific text to speech engine are trained based on travel content.

8. The customized translated content system of claim 1, further comprising an emergency content generator configured to store, in a global database communicatively coupled to the user device, crowdsourced human provided translations for a predetermined set of emergency phrases from a source language into a local language of an emergency location, wherein the custom content generator engine is further configured to generate the customized translated content based at least in part on the crowdsourced human provided translations stored in the global database.

9. A tangible, non-transitory computer readable storage medium, or media, storing machine readable instructions that, when executed by one or more processors, cause the one or more processors to:
   determine one or both of (i) a location of a user device and (ii) contextual information for the user device, the contextual information indicative of content of interest to a user of the user device;
   generate-customized translated content to be presented to the user, wherein the customized translated content includes (i) a plurality of phrases in a source language and (ii) corresponding translations of phrases, in the plurality of phrases, from the source language to a target language, and wherein generating the customized translated content includes selecting, from generalized translated content stored in a local database of the user device, respective phrases of the plurality of phrases, wherein the selecting is based on the one or both of the determined location of the user and the determined contextual information for the user; and
   cause the customized translated content to be displayed to the user such that the selected plurality of phrases and corresponding translations are surfaced to the user from the local database of the user device without requiring a phrase query input from the user of the user device.

10. The tangible, non-transitory computer readable storage medium or media of claim 9, wherein the machine readable instructions, when executed by the one or more processors, cause the one or more processors to determine the one or both of the location of the user and the contextual information for the user based on travel itinerary data obtained for the user.

11. The tangible, non-transitory computer readable storage medium or media of claim 9, wherein the machine readable instructions, when executed by the one or more processors, cause the one or more processors to obtain the travel itinerary data by searching emails of the user to find emails related to travel that include the itinerary data.

12. The tangible, non-transitory computer readable storage medium or media of claim 9, wherein the machine readable instructions, when executed by the one or more processors, cause the one or more processors to generate at least some of the customized content for the user by inserting, into at least one predetermined phrase, at least one specific travel detail obtained from the travel itinerary date for the user.

13. The tangible, non-transitory computer readable storage medium or media of claim 9, wherein the machine readable instructions, when executed by the one or more processors, cause the one or more processors to
   determine a geographical location of the user, and
   generate the customized translated content further based on collected translation queries stored in a global database communicatively coupled to the user device, the collected translation entries entered by other users in the geographical location of the user.

14. The tangible, non-transitory computer readable storage medium or media of claim 9, wherein the machine readable instructions, when executed by the one or more processors, cause the one or more processors to
   determine a contextual location of the user, and
   generate the customized translated content further based at least in part on collected translation queries stored in a global database communicative coupled to the user device, the collected translation entries entered by other users in same contextual locations as the contextual location of the user and in geographical locations other than a geographical location of the user.

15. The tangible, non-transitory computer readable storage medium or media of claim 9, wherein the machine readable instructions, when executed by the one or more processors further cause the one or more processors to generate the customized translated content further based at least in part on crowdsourced human provided translations for a predetermined set of emergency phrases from the source language into a local language of an emergency location, the crowdsourced human provided translations stored in a global database communicatively coupled to the user device.

16. A computer implemented method for generating customized translated content, the method comprising:
   determining, by a processor, one or both of (i) a location of a user device and (ii) contextual information for the user device, the contextual information indicative of content of interest to a user of the user device;
   generating, by the processor, customized translated content to be presented to the user, wherein the customized translated content includes (i) a plurality of phrases in a source language and (ii) corresponding translations of phrases, in the plurality of phrases, from the source language to a target language, and wherein generating the customized translated content includes selecting, from generalized translated content stored in a local database of the user device, respective phrases of the plurality of phrases, wherein the selecting is based on the one or both of the determined location of the user and the determined contextual information for the user; and
   causing, by the processor, the customized translated content to be displayed to the user such that the selected plurality of phrases and corresponding translations are surfaced to the user from the local database of the user device without requiring a phrase query input from the user of the user device.

17. The method of claim 16, wherein determining the one or both of the location of the user and the contextual information for the user comprises determining the one or both of the location of the user and the contextual information for the user based on travel itinerary data obtained for the user.

18. The method of claim 17, further comprising obtaining the travel itinerary data corresponding to the user by searching emails of the user to find emails that contain the itinerary data corresponding to the user.

19. The method of claim 16, wherein generating the customized translated content for the user includes generating at least some of the customized content for the user by inserting, into at least one predetermined phrase, at least one specific travel detail obtained from the travel itinerary data for the user.

20. The method of claim 16, wherein
   determining the location of the user includes determine one or both of (i) geographical location of the user and (ii) contextual location of the user, and
   generating the customized translated content includes generating the customized translated content further based on collected translation queries stored in a global database communicatively coupled to the user device, the collected translation entries entered by other users in the one or both of (i) geographical location of the user and (ii) contextual location of the user.

* * * * *